(12) United States Patent
Reginhard

(10) Patent No.: US 9,247,711 B2
(45) Date of Patent: Feb. 2, 2016

(54) ANIMAL CARRIER FOR TRANSPORTING ANIMALS ONBOARD A VEHICLE

(71) Applicant: Frank Reginhard, Gurgaon (IN)

(72) Inventor: Frank Reginhard, Gurgaon (IN)

( * ) Notice: Subject to any disclaimer, the term of this patent is extended or adjusted under 35 U.S.C. 154(b) by 70 days.

(21) Appl. No.: 14/019,690

(22) Filed: Sep. 6, 2013

(65) Prior Publication Data

US 2014/0352625 A1    Dec. 4, 2014

(30) Foreign Application Priority Data

Jun. 4, 2013  (IN) ............................. 1674/DEL/2013

(51) Int. Cl.
*A01K 31/07*  (2006.01)
*A01K 1/02*   (2006.01)

(52) U.S. Cl.
CPC ............. *A01K 1/0272* (2013.01); *A01K 1/0245* (2013.01)

(58) Field of Classification Search
CPC . A01K 1/0236; A01K 1/0245; A01K 1/0272; A01K 1/0281; A01K 45/005; A01K 1/0035; A01K 31/002; A01K 31/07; B60P 3/04; B61D 3/163

USPC ......... 119/416, 417, 418, 419, 421, 453, 454, 119/455, 456, 457, 472, 474, 475, 476, 488, 119/489, 491, 492, 493, 494, 496, 497, 498, 119/499, 500, 501, 512, 513, 514, 515, 400, 119/401; 224/539, 542; 244/118.1; 296/24.31

See application file for complete search history.

(56) References Cited

U.S. PATENT DOCUMENTS

| | | | | |
|---|---|---|---|---|
| 2,897,781 A * | 8/1959 | Olson | ........................... | 119/496 |
| 5,871,318 A * | 2/1999 | Dixon et al. | .................. | 410/105 |
| 6,250,529 B1 * | 6/2001 | Babbitt et al. | ................ | 224/401 |
| 7,665,420 B2 * | 2/2010 | Plante et al. | .................. | 119/463 |
| 2009/0223463 A1 * | 9/2009 | Chem | ........................... | 119/482 |
| 2011/0126775 A1 * | 6/2011 | Seltzer et al. | ................. | 119/496 |

* cited by examiner

*Primary Examiner* — Trinh Nguyen
(74) *Attorney, Agent, or Firm* — Nadya Reingand; Christopher Pilling

(57) ABSTRACT

A method and an apparatus for transporting animals onboard a vehicle, particularly in the passenger cabin of the vehicle, wherein there is a separate arrangement in the form of an animal carrier for placing the caged animals in the passenger cabin. The animal carrier includes a plurality of features, including but not limited to a ventilation system, a monitoring system, camera surveillance, sound-proofing, filtration etc.

11 Claims, 3 Drawing Sheets

ANIMAL CARRIER FOR TRANSPORTING ANIMALS ONBOARD A VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. FIELD OF THE INVENTION

The present invention relates to animal carriers, and more particularly present invention relates to animal carriers that may be carried onboard vehicles.

2. DESCRIPTION OF RELATED ART INCLUDING INFORMATION DISCLOSED UNDER 37 CFR 1.97 AND 37 CFR 1.98

Cages and other housings are very widely employed for transporting pet animals like cats, dogs etc. The cages are sometimes carried by the pet/animal owners themselves, and at other times are carried in separate sections of a vehicle. For example, during a long journey by train, aircraft or by bus, the animals are placed in the cargo area.

In many cases, the animals/pets are placed in one section of the vehicle, whereas there the pet/animal owners are seated at some other section. This creates a lot of anxiety among the pet/animal owners as they cannot personally monitor the condition of their animals/pets. Sometimes lack of monitoring and visual inspection even leads to the death of the animals, which could be avoided if the pet/animal owners could monitor their own animals/pets. This is true, especially in case where while travelling the pets/animals are placed in the cargo. Any temperature and pressure regulation failure may lead to the animal/pet's death. Also during transportation, a vehicle may suffer from jerks and vibrations, which in many cases may even lead to the cage sliding across the platform of the vehicle and thus frightening the animals/pets and even cause injury to the animals/pets.

Sometimes, smaller animals are allowed to be carried by the passengers along with themselves. However, in such situations, the animals/pets as well as their owners and neighboring travelers have to face difficulties and discomfort. For example, in case of the airline industry, when an animal/pet is carried onboard, the animal/pet owner has to place the animal beneath the front seat. This results in decreased leg room for the animal owner/passenger and the neighboring passengers are also bothered. Noise made by the animal also causes irritation to the passengers.

However to this date no separate accommodation for animals onboard a vehicle has been developed, which may ensure proper comfort and safety for the animals, allow continuous monitoring by the animal/pet owners or any animal caretaker and at the same time is capable of accommodating both small and large sized animals.

Therefore, in light of the above discussion, there is a need for an improved animal carrier which facilitates proper accommodation of animals of different sizes onboard a vehicle and also provides ample facilities to ensure safety and protection of the animals without causing any discomfort to the passengers.

BRIEF SUMMARY OF THE INVENTION

The exemplary embodiments of the disclosure provide an animal carrier for receiving one or more animal cages and an attachment means for attachment of the animal carrier, to the seat tracks of the vehicle.

An object of the present disclosure is to provide a method of transporting animals onboard the passenger cabin of the vehicle, wherein the animals are initially placed in cages and the cages containing animals are then placed in an animal carrier located inside the main passenger cabin of the vehicle.

Another object of the present disclosure is to provide an animal carrier comprising ventilation means. The ventilation means further including flow vents, fans and other additional means for facilitating air circulation.

Another object of the present invention is to provide an animal carrier comprising tinted window panes attached to one or more of the side walls.

Another object of the present invention is to provide an animal carrier comprising one or more tension bars to secure the one or more cages of a plurality of sizes.

Another object of the present invention is to provide an animal carrier comprising a monitoring system for monitoring air circulation, humidity and temperature conditions inside of the animal carrier.

Another object of the present invention is to provide an animal carrier comprising a power-supply system for providing power to the animal carrier.

Another object of the present invention is to provide an animal carrier for carrying of cages containing animals weighing at least 20 pounds.

Another object of the present invention is to provide an animal carrier which comprises at-least two compartments.

A further object of the present invention is to provide a method of transportation of animals onboard a vehicle.

Other embodiments and aspects of the disclosure are described in detail herein and are considered a part of the claimed invention. For a better understanding of the disclosure with advantages and features, refer to the description and to the drawings.

BRIEF DESCRIPTION OF THE SEVERAL VIEWS OF THE DRAWINGS

The features of the present disclosure, which are believed to be novel, are set forth with particularity in the appended claims. The disclosure may best be understood by reference to the following description, taken in conjunction with the accompanying drawings. These drawings and the associated description are provided to illustrate some embodiments of the disclosure, and not to limit the scope of the disclosure.

DETAILED DESCRIPTION OF THE INVENTION

Figure 1:
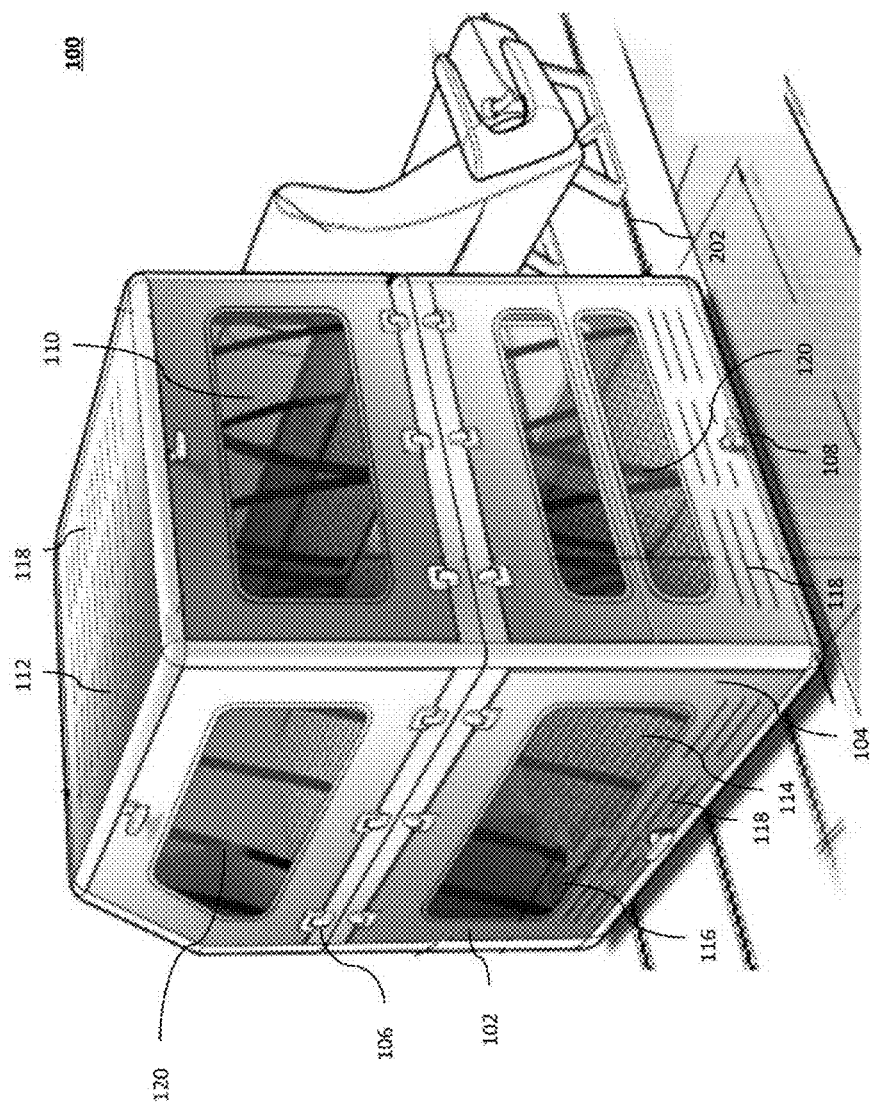
FIG. 1 is a perspective view of the animal carrier, in accordance with an embodiment of the present disclosure.

Before describing the invention in detail, it should be observed that the present invention utilizes apparatus components and method steps related to the transportation of animals onboard a vehicle. Accordingly, the apparatus components have been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "vehicle", as used herein includes, but is not limited to a bus, a car, a train, an aircraft, a helicopter, a hovercraft, a shuttle, a ship or any other transportation device.

FIG. 1 shows a perspective view of an animal carrier 100, in accordance with an embodiment of the disclosure. The figure represents a three dimensional model of the animal carrier 100 which is designed so as to be able to receive one or more cages containing animals. In the figure, the animal carrier 100 is shown to include a body that is made of four side walls 102, a roof 112, a floor 114. The animal carrier 100 is also shown to include a plurality of compartments. However, it should be appreciated that the animal carrier 100 may include only one compartment.

The four side walls 102 are designed to form a closed structure in which the one or more cages may be received. The four side walls 102 together determine the dimensions of the animal carrier 100. The dimensions of the animal carrier 100 can be adjusted depending upon its usage and the type of vehicle in which it is used. Also the dimensions of the animal carrier 100 can be adjusted depending upon the size of the animals that need to be transported.

The cages in which the animals may be transported can be designed according to the size of the animals they are supposed to contain and also the vehicles in which they are supposed to be used. In an embodiment, when the cages may be used for transporting animals in an aircraft, the cages may be pre-approved by the appropriate federal authorities for example the FAA (Federal Aviation Administration) in the USA and the DGCA (Directorate General of Civil Aviation) in India.

In an embodiment, the dimensions of the animal carrier 100 can range between (50-65)"×(50-65)"×(50-65)". Also, it must be understood that the four side walls 102 depicted in the diagram is an exemplary representation of the invention. The number of side walls 102 can be three or more, without deviating from the scope of the disclosure.

Further, the side walls 102 can be made of plurality of light-weight materials, examples of which include, but not limited to, aluminum, light weight alloys, composite materials etc.

Also, the side walls 102 can be semi-sound proof and may have sound dampening material present in them. The use of sound dampening material reduces the intensity of the sound heard inside the animal carrier 100 by the animal. This is particularly helpful when the animal carrier 100 is located inside a vehicle like a train or an aircraft, where the loud noises of the vehicle may frighten the animal. Also there might be occasions when an animal inside the animal carrier may make loud noises and this might irritate fellow passengers. The sound dampening material also reduces the intensity of the sound originating from the animal carrier 100 and thus prevents any discomfort to the passengers travelling in the vehicle. Another advantage of using semi-sound proof side walls is that although the sound intensity is reduced, it is still loud enough to let people outside know if the animal is in discomfort.

Moving on, at least one of the four side walls 102 also includes a door 104 that is hinged using hinges 106 and latched using latches 108. The presence of the door 104 facilitates introduction of the cages of the animals into the animal carrier 100.

In another embodiment two opposite side walls may include hinged doors 104. The doors 104 may facilitate loading of cages containing animals from two sides of the animal carrier 100.

Further, at least one of the side walls 102 may also have window panes 110 attached on it. The window panes 110 enable visual monitoring of animals placed inside the animal carrier 100. The window panes 110 can be made of a plurality of materials, examples of which include, but not limited to glass in its various forms and various kinds of plastics.

In an embodiment, the window panes may be made from carbon fiber glass. In another embodiment, especially when used in an aircraft, the window panes may be made of a material approved by the FAA.

Moving on, in an embodiment the window panes may be made of tinted glass. Further, the glass may be such that it may only be one way tinted, such that the animal cannot see outside the animal carrier 100, but a person on the outside can see the caged animals inside. This is particularly useful so as to ensure that the animal does not get frightened or irritated due to the happenings and disturbances occurring outside the animal carrier 100.

The body of the animal carrier 100 is further defined by the roof 112 and the floor 114. In an embodiment, the floor 114 may have a meshed structure 116 and which may allow for effective air circulation. Though not shown, it should be appreciated that the roof 112 may also include a meshed structure like the one for the floor 114.

Also, the animal carrier 100 includes a ventilation system to allow for circulation of air. To facilitate ventilation, flow vents 118 are shown to be located all over the body of the animal carrier 100. In an embodiment the ventilation system may include at least one fan for facilitating air flow. The at least one fan may be located anywhere, either outside the body of the animal carrier 100 or inside the body of the animal carrier 100. For example, the at least one fan may be located on the roof 112, or on the floor 114 or on the side walls 102. The at least one fan may be configured to work concurrently such that if one of the fans malfunction, the other fans are still working and as such the ventilation in the animal carrier 100 does not suffer. In an embodiment the number of fans in the animal carrier 100 is four.

In a further embodiment, the ventilation system of the animal carrier 100 can be attached to the vehicles air supply system. This is especially relevant in case of an aircraft where the passenger cabin has a separate emergency oxygen system that is deployed when the cabin pressure decreases and the ventilation system of the animal carrier 100 has direct access to this.

Inside the animal carrier 100 a securing mechanism is also provided for securing the cages placed inside the animal carrier 100. The securing of the cages can be done in multiple of ways, examples of which include, but are not limited to belts, nuts, bolts, cable ties, hooks, clamps and the like. In an embodiment the securing of the cages may be done by use of tension bars 120. A plurality of tension bars 120 are present inside the animal carrier 100, and the tension bars 120 have an adjustment mechanism enabling securing cages of different dimensions.

The animal carrier 100 also includes a monitoring system for monitoring the animals. The monitoring system includes a display screen on which multiple data points from a plurality of sensors can be displayed for monitoring the status inside the animal carrier 100. The plurality of sensors may be located inside the enclosure of the animal carrier 100. The plurality of sensors can enable monitoring of air circulation and ventilation in the animal carrier 100. Additional sensors may be also present to monitor temperature and humidity inside the animal carrier 100. The display screen is connected to the plurality of sensors and displays the readings captured by the plurality of sensors. The monitoring system is further configured to raise warning alarms if it detects any malfunctioning of the animal carrier 100. In an embodiment, the warning alarm can be one of an audio alarm, a video alarm and a combination of both.

Furthermore, a power supply system may also be present in the animal carrier 100 for supplying power. The power supply system provides adequate power for running the ventilation system, the monitoring system and other apparatus in the animal carrier 100. In an embodiment, the power supply system of the animal carrier 100 may be hooked into the power system of the vehicle. In another embodiment, the power supply system may be a portable power source like a battery etc.

Moving on, the animal carrier 100 is shown to include two or more compartments stacked in a row over the other. The compartments may be stacked over each other and fastened via a fastening mean. The stacking of compartments over each may enable saving space and also leads to utilization of less power. In an embodiment, the two compartments may be stacked in a row over the other. It should be appreciated that the animal carrier may just include one compartment or even more than two compartments as per the size of the animals being transported.

The size of animal carrier 100 may be varied, depending upon the vehicle in which it is being installed and also on the size of the animals being transported in it. As such both small as well as large animals can be transported in the animal carrier 100. In an embodiment the animal carrier 100 is also designed to carry cages containing animals weighing large animals more than 20 pounds.

In an embodiment, the animal carrier 100 can include internal lighting configured to illuminate the animal carrier 100 internally. This is quite useful, especially during long journeys when long periods of continuous darkness may cause anxiety in the animals and creates uneasiness in them.

In an embodiment the animal carrier 100 may also include a camera mounted on the enclosed body. The camera can monitor the conditions of the pet and display them on a display device located in the vehicle. The feed from the camera may also be broadcasted to a device located outside the vehicle for example to a computing device of the animal owner or a caretaker.

In another embodiment the animal carrier 100 can include a vibration dampening system. The vibration dampers may include, but are not limited to, springs, rubber paddings and the like. The vibration dampers can protect the animals from the jerks received in the vehicle during transportation and help in ensuring a comfortable journey for the animals.

Figure 2:
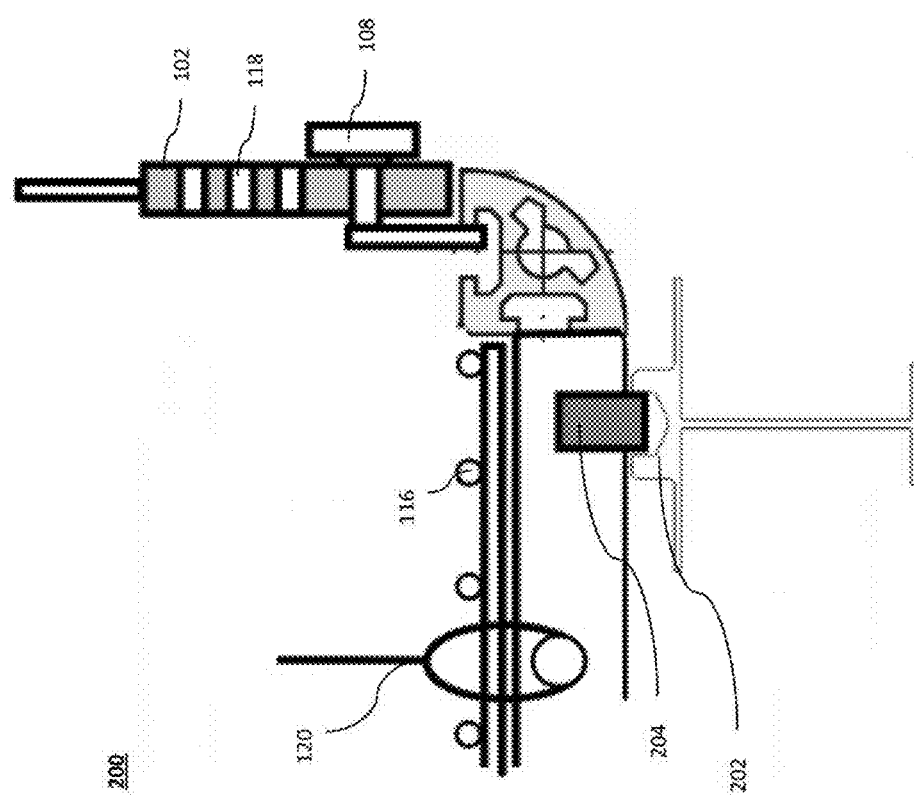
FIG. 2 is a sectional view of an attachment means in the animal carrier, in accordance with an embodiment of the present disclosure.

Moving on, FIG. 2 depicts an embodiment of an attachment means 200 that is used to connect the body of the animal carrier 100 to the vehicle. The attachment means 200 is configured to removably attach the animal carrier 100 to of inside the passenger cabin of the vehicle.

In an embodiment the attachment means 200 can enable the attachment of the animal carrier 100 to the seat tracks 202 of the vehicle, the seat track 202 being a mounting structure in the vehicle on which a seat can be removably attached as can be understood more clearly in conjunction with FIG. 1. As is clearly depicted in FIG. 2 the attachment means includes a slidable male part 204 in form of an extended portion of the animal carrier 100. This slidable male part 204 may be used to slide into a receiving member of the seat tracks 202, thereby completing the attachment of the animal carrier 100 to the vehicle. The attachment may be further reinforced with use of screws or nuts or other such fastening means.

It should be appreciated that other different attachment means may also be used to carry out the attachment of the animal carrier 100 to a vehicle, without deviating from the scope of the disclosure.

Figure 3:
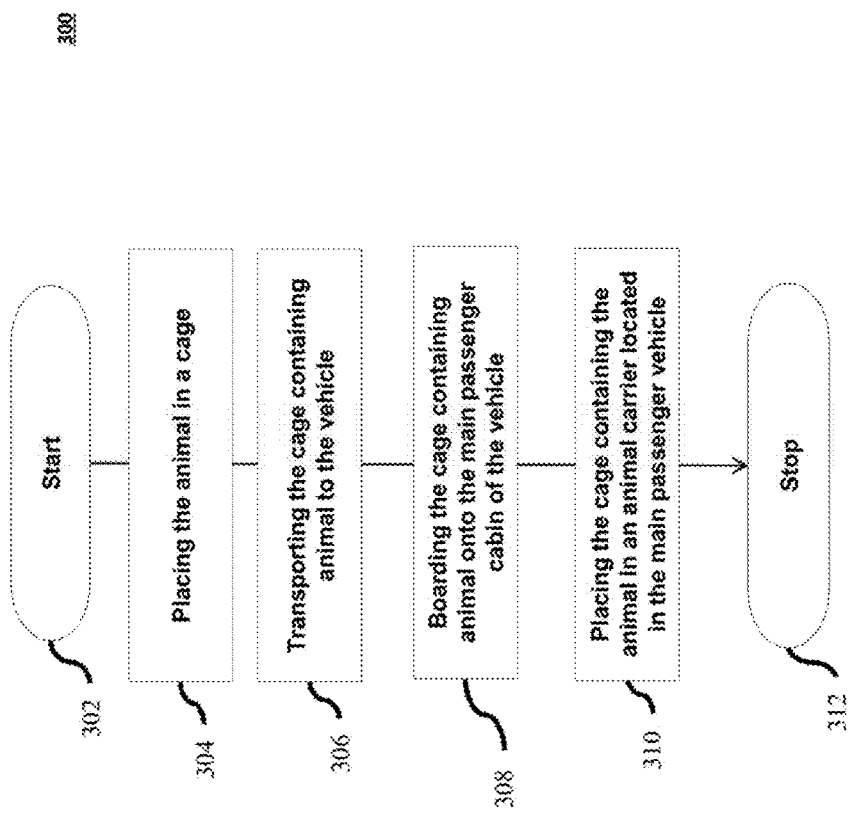
FIG. 3 is a flow chart depicting a method of transporting animals onboard a vehicle, in accordance with an embodiment of the present disclosure.

Moving on, there is depicted in FIG. 3 a flow diagram showing a method 300 for transporting an animal in a vehicle. For the purpose of this description, the method 300 is explained in conjunction with the animal carrier 100 and its various components. However, it will be readily apparent to those ordinarily skilled in the art that the method 300 can also be applied, without deviating from the scope of the invention, for any other animal carriers. Moreover, the disclosure is not limited to the order in which the steps are listed in the method 300. In addition, the method 300 can contain a greater or fewer numbers of steps than those shown in FIG. 3.

The method 300 is initiated at a step 302. At step 304, the animal may be placed in a cage. The dimensions of the cage can be varied depending upon the size of the animal. In an embodiment, the animal transported can weigh more than 20 pounds. The cage can be designed to be substantially large to hold the animal properly and with proper comfort.

Thereafter, at step 306, the cage containing the animal is transported to the vehicle in which the animal is to be transported. The cage containing the animal may be transported to the transportation vehicle via a number of ways including, but not limited to manual transportation, taxi service, conveyor system etc.

Thereafter, at step 308, the cage containing the animal may be boarded on to the main passenger cabin of the vehicle. This step can be carried out in a plurality of ways including, but not limited to, manually boarding the cage onto the vehicle. In another embodiment of the method 30), when the vehicle is an aircraft. The cage containing the animal can arrives at a mini terminal which may be located outside or inside the airport. The mini terminal station may further be temperature controlled, wherein the temperature control can be obtained in a plurality of ways including, but not limited to use of AC, central heating equipment etc. In an embodiment, the cage containing the animal may be required to clear a security check at the airport.

Moving on to step 310, the cage containing the animal may be received by an animal carrier, like the animal carrier 100, located in the main passenger cabin. The step 310 can be carried out in a number of ways including, but not limited to, manually placing the cage containing the animal in the animal carrier 100, using a robotic arm etc. In an embodiment, the cage containing the animal after being placed inside the animal carrier 100 may be secured by means of tension bars 120.

Thereafter the method 300 is terminated at step 312.

In an embodiment of the present method, the method can also include updating the owner of the animal regarding the status of the animal. The owner of the animal may be updated about the animal's status in a number of ways, including but not limited to an SMS, an email, a phone call, a pager message, a live video feed etc.

In a further embodiment of the present method, the method can also include taking the cage containing the animal out of the animal carrier 100, wherein the cage containing the animal can be taken out in a number of ways including but not limited to, manually taking the cage containing the animal out of the animal carrier 100, using a robotic arm etc. After the cage containing the animal is taken out of the animal carrier 100, it can be disembarked from the vehicle in a number of ways including but not limited to, manually taking the cage containing the animal out of the vehicle, using a conveyor system etc. Thereafter the cage containing the animal is transported to the destination location. The cage containing the animal may be transported to the transportation vehicle via a number of ways including, but not limited to, manual transportation, taxi service etc.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

I claim:

1. An animal carrier (100) for transporting animals onboard a vehicle, the animal carrier comprising:
   (i) an enclosed body comprising at least three side walls (102), a roof (112) and a floor (114), one or more cages containing the animals are inserted inside the enclosed body;
   (ii) attachment means (200), the attachment means connected to the body the attachment means removably attached the animal carrier inside the vehicle;
   the animal carrier (100) further comprising one or more tension bars (120) with an adjustable mechanism to secure the cages of different dimensions; wherein said tension bars are located inside the enclosed body and prevent the cages moving/sliding inside the enclosed body.

2. The animal carrier (100) according to claim 1, further comprising: a ventilation system for enabling air circulation in the animal carrier through the means of flow vents (118) located all across the body of the animal carrier and a meshed structure (116) with the help of a plurality of fans working concurrently located inside or outside the body of the animal carrier, the ventilation system of the animal carrier (100) being attachable to the air supply system of the vehicle.

3. The animal carrier (100) according to claim 1, further comprising: windows (110), the windows being located at one or more of the at least three side walls (102), wherein the windows are tinted enabling a person from outside the animal carrier to see inside animals and preventing the animal from seeing outside.

4. The animal carrier (100) according to claim 1, further comprising: a monitoring system wherein the monitoring system comprises one or more sensors for monitoring air circulation, temperature and humidity inside the animal carrier.

5. The animal carrier (100) according to claim 4, wherein the monitoring system comprises a display screen for displaying sensor data to continuously monitor optimum performance of the animal carrier equipped with visual and/or audio alarm.

6. The animal carrier (100) according to claim 1, further comprising: a power supply system for providing power to the animal carrier wherein the power-supply system is hooked into the power system of the vehicle or the power-supply system is a portable power source.

7. The animal carrier (100) according to claim 1, wherein the animal carrier is semi-sound proof as a result of presence of a sound dampening material in the at least three side walls (102), the roof (112) and the floor (114).

8. The animal carrier (100) according to claim 1, wherein the enclosed body comprises one or more compartments, wherein the one or more compartments are stacked in one row over one another in order to stack the cages on top of each other.

9. The animal carrier (100) according to claim 1, further comprising: an interior light configured to illuminate the enclosed body internally and further comprising a camera mounted on the enclosed body to monitor conditions.

10. The animal carrier (100) according to claim 1, wherein the attachment means (200) enable the attachment of the animal carrier to the seat tracks (202) of the vehicle, the seat tracks being a mounting structure in the vehicle on which a seat can be removably attached, the attachment means (200) including a slidable male part (204) in form of an extended portion of the animal carrier (100) to slide into a receiving member of the seat tracks (202).

11. The animal carrier (100) according to claim 1, further comprising: windows (110), the windows being located at one or more of the at least three side walls (102), wherein the windows are transparent.

* * * * *